US011932279B2

(12) United States Patent
Salter et al.

(10) Patent No.: US 11,932,279 B2
(45) Date of Patent: Mar. 19, 2024

(54) ITEM REPOSITIONING METHOD USING A VEHICLE EQUIPPED WITH A LIFT ASSIST DEVICE

(71) Applicant: Ford Global Technologies, LLC, Dearborn, MI (US)

(72) Inventors: Stuart C. Salter, White Lake, MI (US); Brendan Diamond, Grosse Pointe, MI (US); David Kennedy, Canton, MI (US); John Robert Van Wiemeersch, Novi, MI (US); Pietro Buttolo, Dearborn Heights, MI (US); Paul Kenneth Dellock, Northville, MI (US); David Brian Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 41 days.

(21) Appl. No.: 17/550,266

(22) Filed: Dec. 14, 2021

(65) Prior Publication Data
US 2023/0182779 A1 Jun. 15, 2023

(51) Int. Cl.
*B60W 60/00* (2020.01)
*B60P 1/00* (2006.01)
*G01C 21/34* (2006.01)
*G01C 21/36* (2006.01)
*G05D 1/00* (2006.01)

(52) U.S. Cl.
CPC ........... *B60W 60/0025* (2020.02); *B60P 1/00* (2013.01); *G01C 21/3407* (2013.01); *G01C 21/36* (2013.01); *G05D 1/0212* (2013.01); *G05D 1/0276* (2013.01); *B60W 2300/12* (2013.01)

(58) Field of Classification Search
CPC . B60W 60/0025; B60W 2300/12; B60P 1/00; G01C 21/3407; G01C 21/36; G05D 1/0212; G05D 1/0276
See application file for complete search history.

(56) References Cited

U.S. PATENT DOCUMENTS

| | | | |
|---|---|---|---|
| 8,998,555 B1 | 4/2015 | Ingham | |
| 9,937,848 B1 * | 4/2018 | Grabowski | ............... B60P 7/15 |
| 11,045,952 B2 * | 6/2021 | Gong | ..................... B25J 9/1697 |
| 2017/0322555 A1 * | 11/2017 | nikolic | ..................... B25J 11/00 |
| 2018/0082343 A1 * | 3/2018 | Gordon | ............. B60G 17/0165 |
| 2018/0373236 A1 * | 12/2018 | Ewert | ..................... G06F 21/35 |
| 2019/0031075 A1 * | 1/2019 | Koch | ..................... B60P 1/6481 |
| 2019/0051169 A1 * | 2/2019 | Gomez Gutierrez | .. G08G 1/087 |
| 2019/0228375 A1 * | 7/2019 | Laury | .................. G05D 1/0088 |
| 2019/0250636 A1 * | 8/2019 | Szubbocsev | ..... G06Q 10/08355 |
| 2019/0322504 A1 | 10/2019 | Raab | |

(Continued)

FOREIGN PATENT DOCUMENTS

EP 2987761 B1 3/2021

*Primary Examiner* — Rachid Bendidi
*Assistant Examiner* — Moises Gasca Alva
(74) *Attorney, Agent, or Firm* — Vichit Chea; Carlson, Gaskey & Olds, P.C.

(57) ABSTRACT

An item repositioning method includes, in response to a request for an item, moving a vehicle along a first route to a location of the item, loading the item in the vehicle using a lift assist device mounted to the vehicle, moving the vehicle along a second route to transport the item to a desired location, and at the desired location, unloading the item from the vehicle using the lift assist device.

19 Claims, 7 Drawing Sheets

(56) References Cited

U.S. PATENT DOCUMENTS

2019/0378085 A1* 12/2019 Sipes ................. G06Q 10/0833
2020/0051001 A1*  2/2020 Donnelly ........... G01C 21/3438
2020/0310438 A1* 10/2020 Suzuki ................. G05D 1/0212
2020/0316786 A1* 10/2020 Galluzzo ................ B25J 19/023

* cited by examiner

ITEM REPOSITIONING METHOD USING A VEHICLE EQUIPPED WITH A LIFT ASSIST DEVICE

TECHNICAL FIELD

This disclosure relates generally to methods of using a vehicle to reposition items at a worksite, for example.

BACKGROUND

Many vehicles, such as pickup trucks, include a cargo bed. Various structures have been utilized in connection with the cargo bed to help secure and manage loads within the cargo bed.

SUMMARY

In some aspects, the techniques described herein relate to an item repositioning method, including: in response to a request for an item, moving a vehicle along a first route to a location of the item; loading the item in the vehicle using a lift assist device mounted to the vehicle; moving the vehicle along a second route to transport the item to a desired location; and at the desired location, unloading the item from the vehicle using the lift assist device.

In some aspects, the techniques described herein relate to an item repositioning method, wherein the first route and the second route are each at least partially planned using data obtained by the vehicle, the data including information about areas near the vehicle, areas near the item, or both.

In some aspects, the techniques described herein relate to an item repositioning method, further including using at least one sensor of the vehicle to obtain the data.

In some aspects, the techniques described herein relate to an item repositioning method, further including using at least one camera of the vehicle to obtain data.

In some aspects, the techniques described herein relate to an item repositioning method, wherein the first route and the second route are each at least partially planned using data obtained by a drone.

In some aspects, the techniques described herein relate to an item repositioning method, wherein portions of the first route are planned when the vehicle is moving along the first route.

In some aspects, the techniques described herein relate to an item repositioning method, wherein the request is a request that is sent from a user.

In some aspects, the techniques described herein relate to an item repositioning method, wherein the request is a request that is sent based on a passage of time.

In some aspects, the techniques described herein relate to an item repositioning method, wherein the first route is the same as the second route.

In some aspects, the techniques described herein relate to an item repositioning method, further including moving the vehicle autonomously along the first route and moving the vehicle autonomously along the second route.

In some aspects, the techniques described herein relate to an item repositioning method, further including sliding the lift assist device along a crossbar in a cross-vehicle direction after moving the vehicle along the first route and before moving the vehicle along the second route.

In some aspects, the techniques described herein relate to an item repositioning method, wherein the vehicle is a passenger vehicle.

In some aspects, the techniques described herein relate to an item repositioning method, wherein the vehicle is a pickup truck.

In some aspects, the techniques described herein relate to an item repositioning method, wherein the vehicle is a road vehicle.

In some aspects, the techniques described herein relate to an item repositioning method, wherein the lift assist device is a robotic arm.

In some aspects, the techniques described herein relate to an item repositioning method, further including, during the loading, positioning the item in a first area of the vehicle when the item is a first type of item, and positioning the item in a different, second area of the vehicle when the item is a different, second type of item.

In some aspects, the techniques described herein relate to an item repositioning method, further including autonomously moving the vehicle to a location of trash and using the lift assist device to load the trash into the vehicle.

In some aspects, the techniques described herein relate to a vehicle assembly, including: a cargo bed of a vehicle; a crossbar spanning the cargo bed, the crossbar slidable relative to the cargo bed; a lift assist device mounted to the crossbar; and at least one sensor that collects data used to plan a route for the vehicle to autonomously move to a location where the lift assist device can load an item into the cargo bed.

In some aspects, the techniques described herein relate to a vehicle assembly, further including at least one camera that collects data used to plan the route.

In some aspects, the techniques described herein relate to a vehicle assembly, wherein the vehicle is a pickup truck.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a crossbar utilized in connection with a cargo bed of a vehicle, and a lift assist device that is mounted to the crossbar. The crossbar can be slidably coupled to rail assemblies. The crossbar can be repositioned by sliding the crossbar along the rails. The repositioning of the crossbar along the rails can be automatic.

Figure 1:
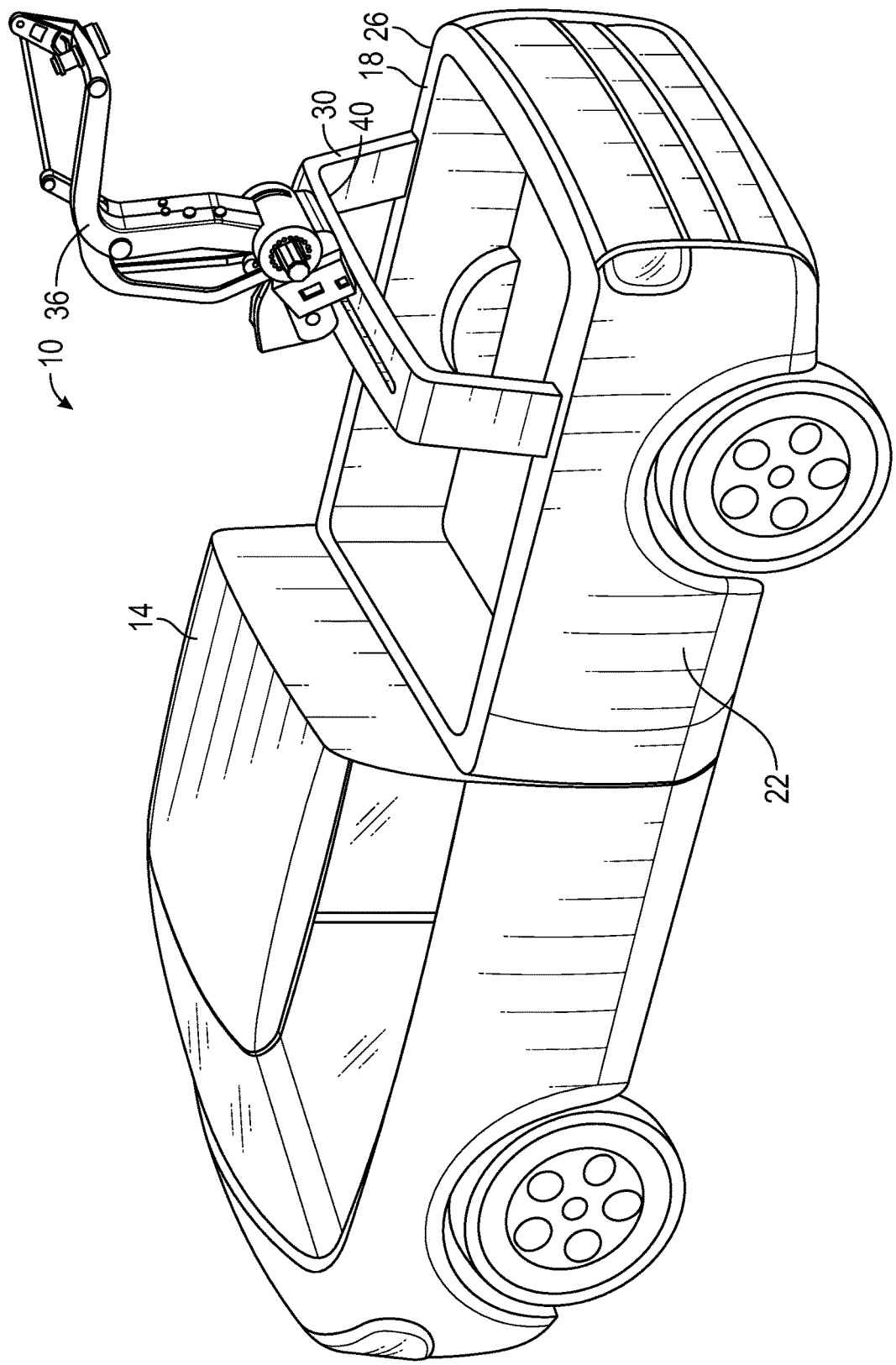
FIG. 1 illustrates a perspective view of a vehicle having a cargo bed and a crossbar with a lift assist device mounted atop the crossbar.
Figure 2:
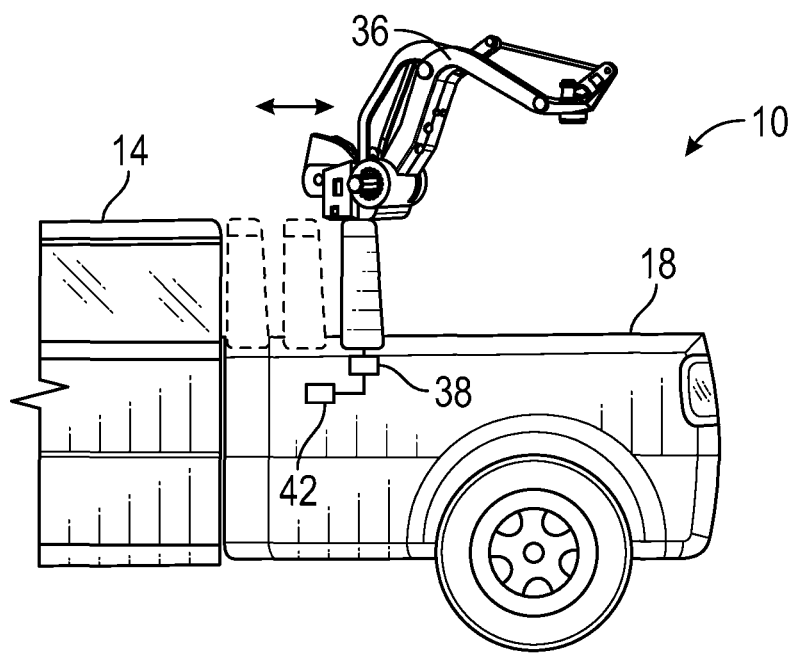
FIG. 2 illustrates a side view of a portion of the vehicle in FIG. 1.

With reference to FIGS. 1 and 2, an exemplary vehicle 10 includes a cab 14 and a cargo bed 18 that is aft the cab 14. The vehicle 10 is a pickup truck in this example. The pickup truck is a passenger vehicle that is licensed to operate on road. The example pickup truck is thus a road vehicle.

The vehicle 10, in this example, can operate as an autonomous vehicle that can interpret its surroundings and travel to different locations through a combination of sensors, cameras, etc. The vehicle 10 can include control systems that interpret sensed information to detect obstacles and choose the most appropriate travel paths for the vehicle 10.

The cargo bed 18 includes a driver side wall assembly 22 and a passenger side wall assembly 26. A crossbar 30 extends from the driver side wall assembly 22 to the passenger side wall assembly 26 such that the crossbar 30 is spanning over the cargo bed 18.

A lift assist device 36 is mounted atop the crossbar 30. The lift assist device 36 can be used to assist in loading items into the cargo bed 18. In another example, the lift assist device 36 is mounted to an underside 40 of the crossbar 30 such that the lift assist device 36 is suspended from the crossbar 30.

The crossbar 30 can be repositioned by sliding between forward positions and rearward positions along a length of the cargo bed 18. Repositioning the crossbar 30 repositions the lift assist device 36. The crossbar 30 can be repositioned to reposition the lift assist device 36.

In this example, the lift assist device 36 is slidably mounted to the crossbar 30 such that the lift assist device 36 can slide back-and-forth in a cross-vehicle direction. The lift assist device 36 can additionally be repositioned by translating the lift assist device 36 in a cross-vehicle direction relative to the crossbar 30.

The vehicle 10, in this example, includes an actuator assembly 38 and a control module 42. In response to commands from the control module 42, the actuator assembly 38 can move the crossbar 30 forward and aft along the cargo bed 18. The actuator assembly 38 can also move the lift assist device 36 relative to the crossbar 30 in a cross-vehicle direction.

The control module 42 is shown schematically in FIG. 2. It should be understood that the control module 42 may include hardware and software, and could be part of an overall vehicle control module, such as a battery on-board control module, or vehicle system controller (VSC), or could alternatively be a standalone controller separate from VSC.

In an example embodiment, some of the operations of the control module 42 described herein may be performed by separate control modules, such as the on-board control module, and vehicle control module. In this regard, the control module 42 may include one or more of an on-board control module and vehicle control module.

The control module 42 can be programmed with executable instructions for interfacing with and operating the various components of the vehicle 10. The control module 42 can include a processing unit and non-transitory memory for executing the various control strategies and modes. In an example, the control module 42 includes, as memory, electrically erasable programmable read-only memory (EEPROM), which is a type of non-volatile memory often used in computers and remote keyless systems. EEPROMs can be programmed and erased in circuit by applying special programming signals, which may be sent by the control module 42.

In an example, the actuator assembly 38 includes a motor within the driver side wall assembly 22 and another motor within the passenger side wall assembly 26. The motors can be used to drive forward and rearward movements of the crossbar 30. The motors may include a mechanical break to hold a position of the crossbar 30.

In particular, the actuator assembly 38 associated with the driver side wall assembly 22 can comprises a DC motor that drives a screw mechanism through a set of reduction gears. In another example, an AC motor could be used to drive the screw mechanism. The AC motor could be a 150 kV AC motor. The driving or rotating of the screw mechanism by the DC motor moves a platform or base along the driver side wall assembly 22. The crossbar 30 is secured directly to the platform or base. Another DC motor, screw mechanism, and set of reduction gears are associated with the passenger side wall assembly 26 and used to drive the passenger side of the crossbar 30. While an exemplary type of actuator assembly 38 is described above, other options for moving the crossbar 30 are contemplated and fall within the scope of this disclosure.

The actuator assembly 38 can be activated by the control module 42 in response to a command from a user. The command causes the actuator assembly 38 to move the crossbar 30. The command may be sent through a mobile or smart device, such as a smartphone, key fob, tablet, etc. In another example, the user interacts with a touchscreen inside the cab 14 to cause the control module to initiate the command.

Figure 3:
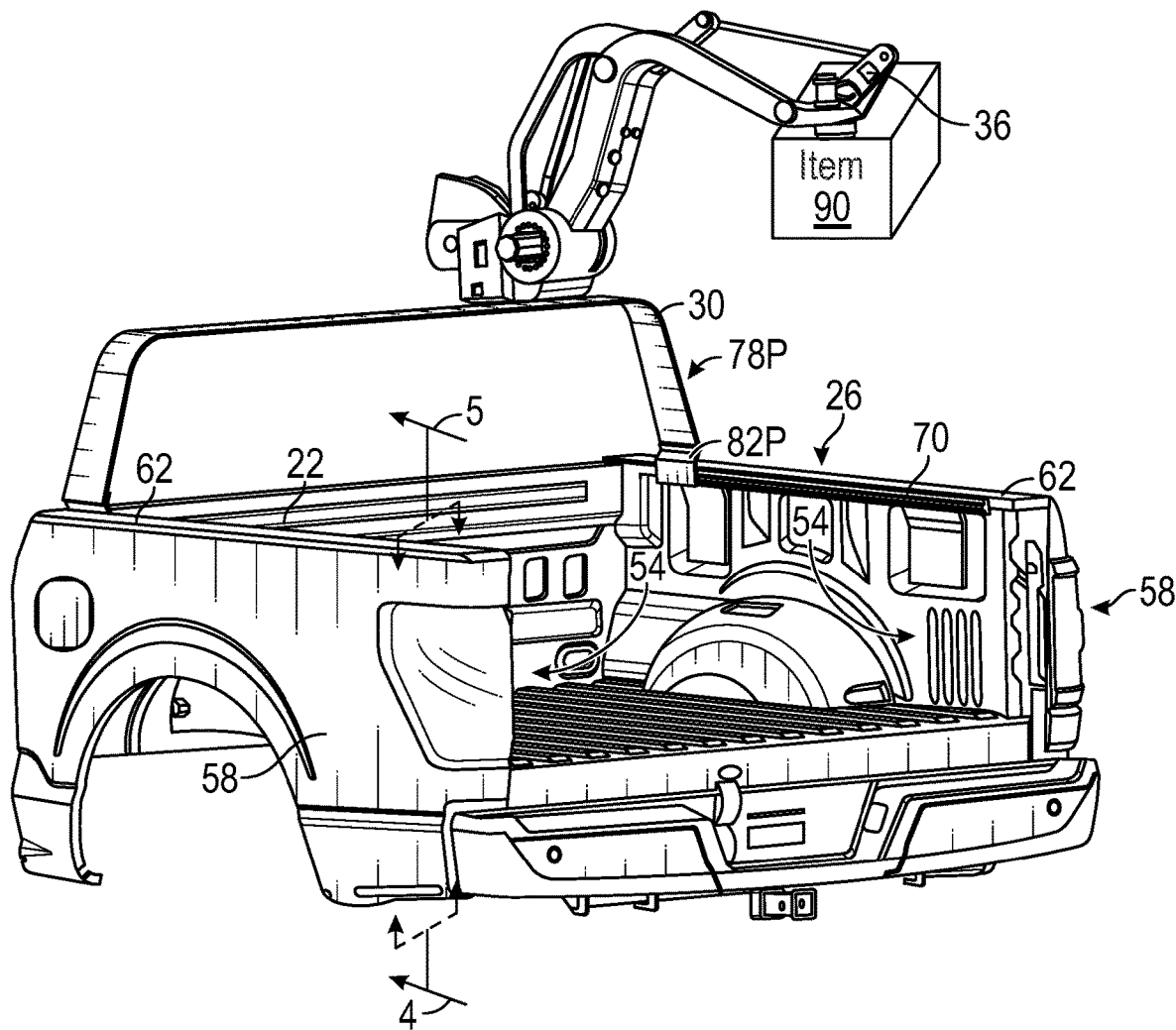
FIG. 3 illustrates a perspective view of the crossbar and cargo bed of FIG. 1 with selected portions removed.
Figure 4:
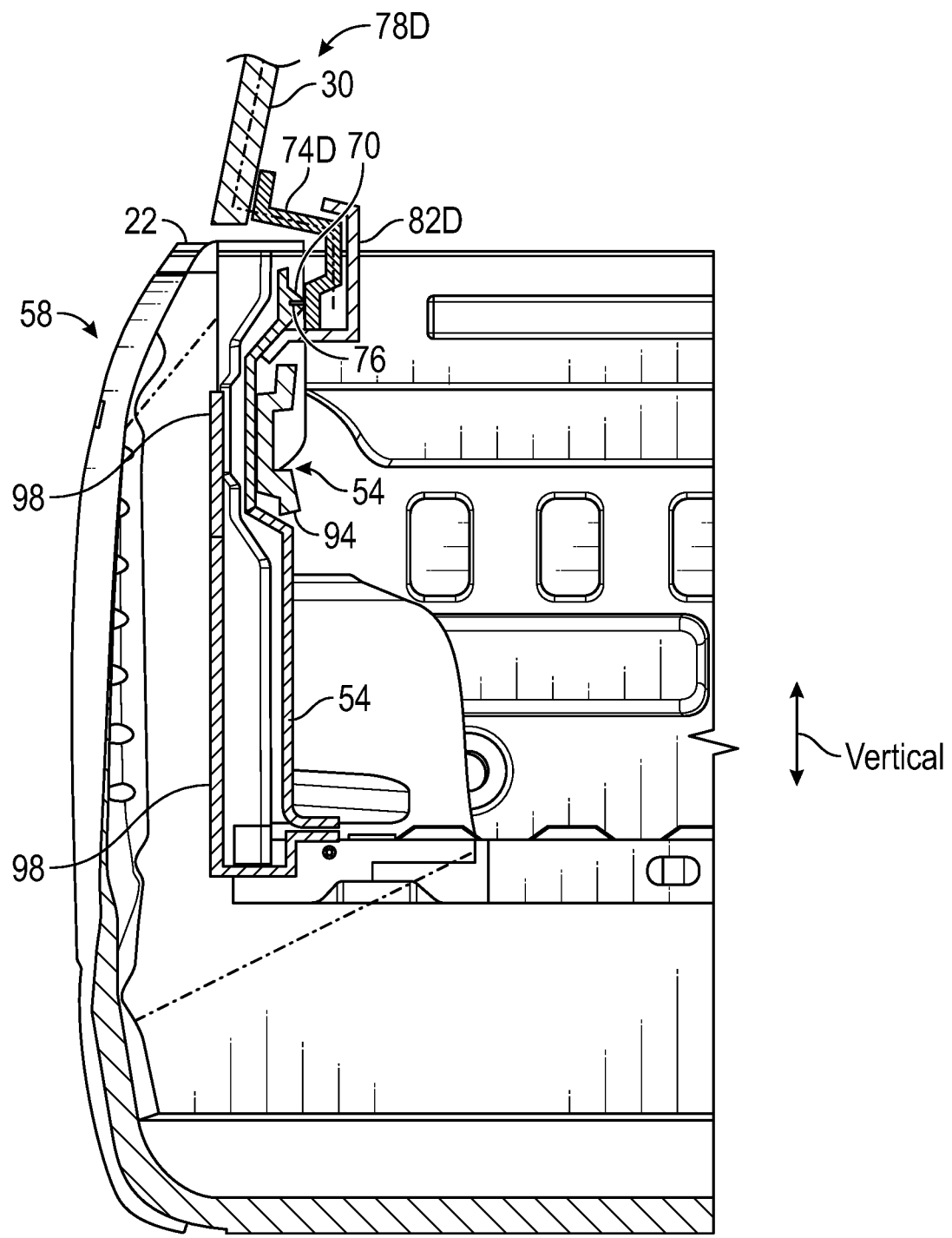
FIG. 4 illustrates a section view taken at line 4-4 in FIG. 3.

With reference now for FIGS. 3 and 4, the driver side wall assembly 22 and the passenger side wall assembly 26 each include an inner side 54, an outer side 58, and an upper side 62. A rail 70 is mounted to the inner side 54 of the driver side wall assembly 22. Another rail 70 is mounted to the inner side 54 of the passenger side wall assembly 26.

To slidably couple the crossbar 30 to the rails 70, a driver side mounting bracket 74D couples an end portion 78D of the crossbar 30 to the driver side rail 70. A passenger side mounting bracket couples a passenger side end portion 78P of the crossbar 30 to the passenger side rail 70.

The driver side mounting bracket 74D has a portion slidably coupled to the driver side rail 70. A corresponding passenger side mounting bracket has a portion slidably coupled to the passenger side rail 70. In this example, the mounting brackets 74D engages with the rail 70 through a roller and bushing assembly 76, which can transfer loads from the crossbar 30 to the respective rail 70.

A cover 82D conceals at least part of the mounting bracket 74D and the roller and bushing assembly 86. The cover 82D can help to protect these components from dirt and damage The cover 82D can allow wiring (e.g., wiring used to power the actuator assembly 38) to travel in a manner similar to that of a sliding door on conventional vehicles while protecting the wiring. Another cover 82P conceals at least part of the mounting bracket on the passenger side along with the associated roller and bushing assembly.

The rail 70 can mount directly to the inner sides 54 of the driver side wall assembly 22 and the passenger side wall assembly 26. The rail 70 may mount to existing cargo management tie down locations and structural parts for automobiles.

In the exemplary embodiment, the rails 70 are mounted such that the rails 70 are vertically beneath the upper sides 62 of the driver side wall assembly 22 and the passenger side wall assembly 26. This helps to hide the rails 70 from view. All portions of the crossbar 30, in this example, are vertically above the upper sides 62. Vertical, for purposes of this disclosure, is with reference to ground and an ordinary orientation of the vehicle 10 during operation.

The example lift assist device 36 is a robotic arm. In a specific example, the lift assist device 36 is a palletizing arm. The lift assist device 36 can be used to accomplish a variety of tasks, such as loading cargo, painting a building, supporting an object while the object is installed, etc.

When the lift assist device 36 is needed on the passenger side of the vehicle 10, the lift assist device 36 (FIG. 2) the control module 42 can cause the actuator assembly 38 to translate the lift assist device 36 along the crossbar 30 to the passenger side. When the lift assist device 36 is needed on the driver side, the lift assist device 36 can translate over to the driver side. Mounting the lift assist device 36 on the crossbar 30 rather than the cargo bed 18, for example, keeps the cargo bed 18 accessibly for cargo.

Through movement of the crossbar 30 and the lift assist device 36, an item 90 near the vehicle 10 can be lifted and moved into the vehicle 10. The vehicle 10 can them move to transport the item 90 to a desired location, where the item 90 can be unloaded from the vehicle 10 through movement of the crossbar 30 and lift assist device 36.

Figure 5:
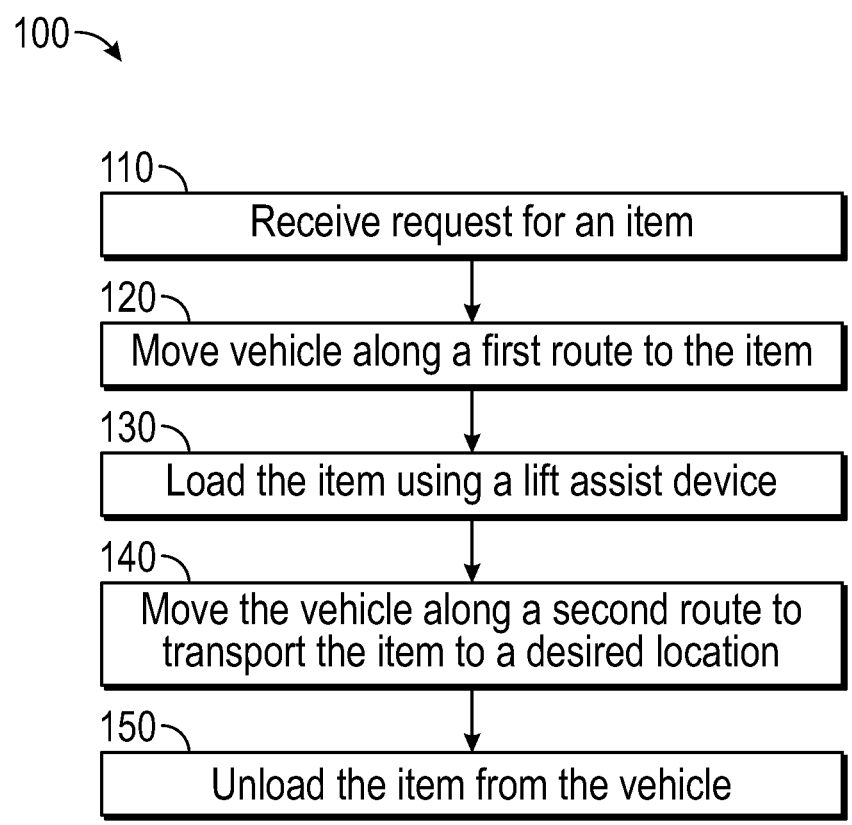
FIG. 5 illustrates a flow of an example method of repositioning an item using the vehicle of FIGS. 1-4.
Figure 6:
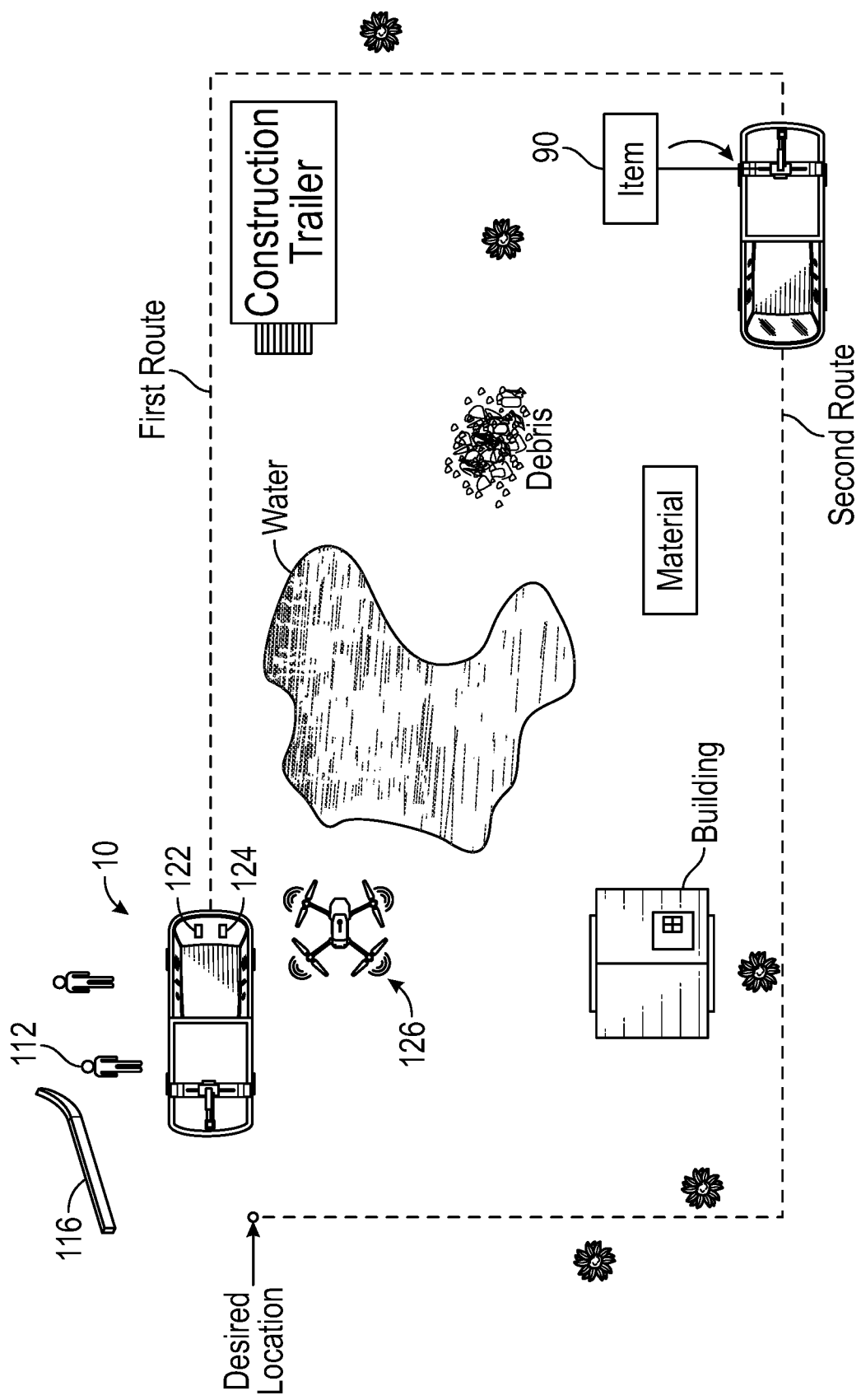
FIG. 6 illustrates a worksite where the method of FIG. 5 is used.

With reference now to FIGS. 5 and 6 and continuing reference to FIGS. 1-4, an example item repositioning method 100 at a worksite utilizes the vehicle 10. The method 100 begins at a step 110 where a request is received at the vehicle 10. The request can be sent by at least one user 112. The request can be a request for the vehicle 10 to deliver the item 90 to a desired location. The item 90 can be, for example, tools, building materials, supplies, etc. In this example, the item 90 is a stack of bricks that the at least one user 112 needs to complete a wall 116.

The users can communicate with the vehicle 10 regarding future requests for items on a periodic, scheduled, or event driven basis. The communication, either via automated or user input, can be transmitted via an associated vehicle request such that the vehicle 10 is able to identify what functions to perform in the future. The request can be via an app on a handheld device, for example.

The request can include a location of the at least one user 112 that makes the request, along with identifying information (facial recognition, name, job, etc.). The request can include a location where the item 90 should be dropped off. This is designated as the desired location in FIG. 6. If the user 112 wants the drop off to be authorized, the request can authorize another user to receive the item 90.

Requests can be automated to an extent such that the vehicle 10 brings a particular type of item (tool, material, etc.) based on the work being performed that day or based on completion of a project. The vehicle 10 can, in some examples, recognizing that the previously used items, such as tools, need to be returned to a warehouse and that new items need to be retrieved. The user 112 can select the item 90 from an available "catalog" that provides all of the types of item that the vehicle 10 can identify, pick up, and deliver.

Information for the item 90 (location, max force that the lift assist device 36 can apply to the item 90, how to secure the item 90 within the vehicle 10) can also be programmed into the catalog as a set of instructions to ensure the vehicle 10 is able to pick up/drop off items without damaging items The request, in another example, can be based on a passage of time. For example, the request can be received by the vehicle 10 when two hours have passed since the vehicle 10 last delivered an item to the desired location.

Requests can be preplanned based on a completion stage of a project requiring the item 90. A determination of a percent completion can be based on user input, identified by a drone, or a sensor suite of the vehicle 10. The determination can be based on a comparison of an image of a particular project to a computer-generated image of the project when finished.

The request can be based on consumption rate of materials, or based on a timeline provided by worksite management regarding how fast each project should proceed. The request can be based on the expected tasks that will be completed that day or that week.

In some examples, requests can be programmed ahead of schedule so that particular types of items are delivered to the desired location at a specific time (after lunch break, before work the next day, etc.).

In response to the request received at the step 110, the vehicle 10, at a step 120 moves autonomously along a first route and stops near the item 90. The vehicle 10 then loads the item 90 into the cargo bed 18 of the vehicle 10 at a step 130. The lift assist device 36 is used to load the item 90 into the cargo bed 18 in this example. The loading can include sliding the lift assist device 36 along the crossbar 30 in a cross-vehicle direction to appropriately position the lift assist device 36.

Next, at a step 140, the vehicle 10 autonomously moves along a second route to a desired location, which is near the at least one user 112 and the wall 116. After the vehicle 10 is at the desired locations, the item 90 is unloaded from the cargo bed 18 at a step 150. The at least one user 112 can then use the item 90 (i.e., bricks) to complete the wall 116.

Notably, prior to the step 120, the first route is at least partially planned using data obtained by the vehicle 10. The data can include information about areas near the vehicle 10, areas near the item, or both.

The vehicle 10 can include a plurality of sensors 122 and a plurality of cameras 124 that collect the information. The sensors 122 can include LIDAR, RADAR, Ultra-Wideband Positioning and Sensor Technologies, etc.

In some examples, one or more cameras can be mounted to the crossbar 30 and one or more cameras can be mounted to the lift assist device 36. Field of view for these cameras can be changed by moving the crossbar 30 fore and aft within the vehicle 10. Field of view for these cameras can additionally be changed by translating the lift assist device 36 along the crossbar 30, by moving the lift assist device 36, or both.

In this example, the vehicle 10 is associated with a drone 126 that is used to collect additional information about areas near the vehicle 10, areas near the item, or both. The drone 126 can be launched from the vehicle 10 and can be controlled from the vehicle 10.

The sensors 122, cameras 124, and drone 126 can detect, in this example, obstacles that the vehicle 10 should avoid when traveling along the first route. The sensors 122, cameras 124, and drone 126 can detect, in this example, the location of the item 90.

The obstacles include water, a construction trailer, trees, debris, construction materials, buildings, etc. The first route is planned automatically so that the vehicle 10 can avoid these obstacles when moving along the first route to the item 90.

The second route is also at least partially planned using data obtained by the vehicle 10. The data can include information about areas near the vehicle, areas near the desired location, and areas near the item 90.

The second route can be at least partially planned after loading the item 90 at the step 130. Alternatively, the second route can be planned when the first route is planned or when the vehicle 10 is traveling along the first route. In some examples, the second route is the same as the first route such that the vehicle 10 backtracks the first route when returning from the location of the item 90 to the desired location.

While the location of the item 90 and the desired location may be known, the first route and the second route do not need to be entirely planned prior to the vehicle 10 moving along the first route or the second route. For example, the first route can be planned and refined as the vehicle 10 is moving along the first route. The sensors 122, cameras 124, and drone 126 can continually scan ahead of the vehicle 10 and refine the first route as the vehicle 10 moves along the first route.

During the loading at the step 130, the item 90 can be placed in a particular area of the vehicle 10 based on what type of item is being loaded. If, for example, the item were a particular type of tool (e.g., a nail gun), the item 90 may be positioned in an area of the cargo bed 18 that is designated for that nail gun. If the item 90 is another type of item (e.g., a ladder), the item 90 may be positioned in another designated area of the cargo bed 18. Positioning the item 90 in particular areas can, among other things, help the user 112 quickly identify whether or not the vehicle 10 includes the correct items.

The sensors 122 and cameras 124 of the vehicle 10 can be used when the lift assist device 36 is loading and unloading the item 90. The sensors 122 and cameras 124 can be used to identify the item 90 and to determine and orientation of the item 90, for example. The vehicle 10 can reorient itself relative to the item 90 so that the item 90 is within reach of the lift assist device 36.

The vehicle 10 can use the lift assist device 36 to place the item 90 into a specified compartment of the vehicle 10 for transport. Via the sensors 122, the cameras 124, or both, the vehicle 10 can scan Quick Response, UPC (Universal Product Code), or other graphic based codes or track the item 90 and other items using RFID tags. The information on the codes or tags can reveal where the item 90 should be stored when the item 90 is placed inside the vehicle 10.

Placement of the item 90 can be organized for each request. If more than one request is being fulfilled and more than one item 90 loaded, the vehicle 10 can recall during the unloading process which item belong at which desired location. Placement of the item 90 within the vehicle 10 can be done to avoid damage during transport. As required, robots and humans can also be used to bring the item 90 to the vehicle 10 and assist in loading. If the vehicle 10 is unable to use the sensors 122, cameras 124, and drone 126 to locate where to pick up the item 90, user input, such as hand placement of an individual near the item 90, can inform the lift assist device 36 the location of the item 90 and where to grab the item 90.

Once the item 90, and any other items listed on the request, are loaded from the storage location, the vehicle 10 can perform verification using the cameras 124 (Center High-Mounted Stop Lamp camera, interior camera, etc.) to ensure that the item 90 and the other items are properly positioned on the vehicle 10.

If the vehicle 10 has picked up items that require delivery to different desired locations, the vehicle 10 can determine the optimal second route based on priority, received request order, and route length, for example.

During transportation, the vehicle 10 can perform load stabilization of the items via the lift assist device 36 based on identifying they are shifting during travel using the cameras 124, for example.

Drop off and retrieval effectiveness, timeliness, etc., of the items can be recorded at multiple points in the process and used for optimization/planning or to schedule corrective/issue containment actions.

When unloading the item 90, the lift assist device 36 can show the user 112 the item to ensure the user 112 is getting the correct item 90. Information regarding the item 90 can also be determined or provided by the user 112. The information can be used to initiate repair, refueling, and recharging requests or to prevent a clean-up from being initiated. For example, requests could include "this cutting tool needs a new blade;" "this generator needs more fuel;" "this drill needs the battery recharged;" "this paint container is still half full, keep it in an upright orientation."

The lift assist device 36 can, in some examples, perform inspection of the item 90 as the item 90 is picked up/returned. Weight can be assessed by lifting the item 90 (reading from force sensor at robot tooltip). If the item 90 includes a blade, a condition of the blade can be accessed by slowly moving a camera along the tool, in proximity of blade. If software running on the vehicle 10 cannot accurately evaluate the images, the images of the item 90 can be forwarded to personnel on site or to an off-site evaluator utilizing cloud-based communications.

Feedback and instructions from team members can be provided via the cameras 124 and sensors 122 on the vehicle 190 or via mobile devices using vehicle 10 as the communications hub.

In some examples, the vehicle 10 can be used to clean up a worksite. The vehicle 10 can, for example, autonomously move around the worksite and can pick up debris and trash. The vehicle 10 can travel along a route that moves the vehicle 10 near various locations around the worksite so that the vehicle 10 can collect the debris and trash at these locations. At these locations, the lift assist device 36 can be used to move the trash and/or debris into the vehicle 10. Locations having trash and debris can be at least partially identified using data collected by the vehicle 10 or the drone 126.

Garbage and debris can be identified using sensors 122, cameras 124, drone 126, or some combination of these. In some examples, the user can show the vehicle 10 the types of items that need to be retrieved (wrappers, paint buckets, etc.). The vehicle can then leverage the vehicle sensor suite and image recognition software to identify and retrieve similar items around a worksite.

Over time, machine learning can help to refine the routes taken by the vehicle 10 when retrieving items, such as the item 90, or picking up trash. For example, the most effective material resupply timing, tool runs, setup and teardown sequences can be recorded over time and used to refine future routes.

In some examples, if no requests are initiated, the vehicle 10 can visit, park, or patrol a worksite and wait for a request to be initiated.

The vehicle 10 can act as a mobile dumpster by patrolling a worksite and cleaning up types of items that can be thrown away. The items can be specific containers, bins, boxes, or bags that are recognized by the sensors 122 and the cameras 124.

The vehicle 10 can be automatically programmed to go to each worksite location once work is completed for the day and move the unused materials and tools at each job site to a storage location so these types of items are not stolen when no individuals are at the jobsite.

When individuals are not at the job site, the vehicle 10 can be programmed to deliver specific items, such as tools and materials, that are required for work the next day. When individuals are not at the job site, the vehicle 10 can be used in conjunction with other tools such as a water pump or vacuum to suck up water and debris from various locations on the worksite.

Figure 7:
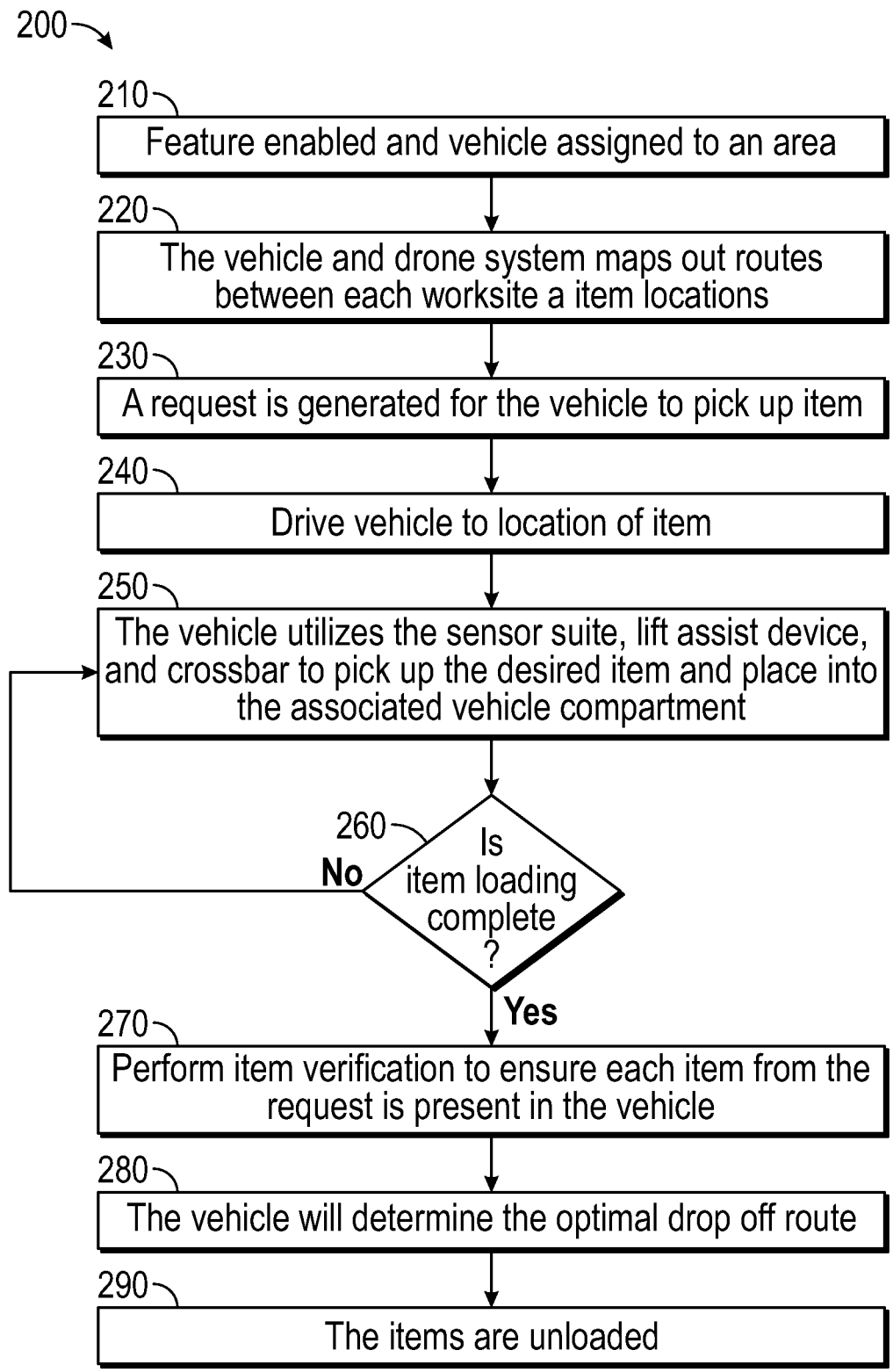
FIG. 7 illustrates a flow of yet another example method of repositioning an item using the vehicle of FIGS. 1-4.

With reference now to FIG. 7 and continuing reference to FIGS. 1-6, another example item repositioning method 200 associated with the vehicle 10 begins at a step 110 where the item repositioning method feature is enabled and the vehicle 10 is assigned to a geographical area. The geographical area can include multiple individual worksites.

Next, at a step 220, the vehicle 10 and its associated drone map out routes between each worksite and various item locations.

At a step 230, a request is generated and received by the vehicle 10. The request is for the vehicle 10 to pick up items (parts, tools, materials, etc.) or to provide support functions. The vehicle 10 then, at a step 240, drives to a location, which can be a location of a desired item.

The vehicle 10 then, at the step 250, utilizes the sensor suite, crossbar 30, and the lift assist device 36 to pick up the desired item or items and place them into an associated compartment or area of the vehicle 10.

At a step 260, the method 200 assesses whether or not the loading is complete. If complete, then, at a step 270, the method 200 performs an item verification to ensure that each item requested is present in the vehicle 10.

The vehicle 10 then can determine an optimal return route at a step 280. The return route takes the vehicle 10 with the items to a desired location. The return route can be selected from one of the routes that were mapped out in the step 220.

Next, the method 200 moves to the step 290 where the items are unloaded using the sensor suite, crossbar 30, and the lift assist device 36.

Auxiliary vehicle functions can then be performed if required. The method 200 can be repeated as required.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. An item repositioning method, comprising:
   in response to a request for an item, moving a vehicle along a first route to a location of the item, wherein the request is a request that is sent based on a passage of time;
   loading the item in the vehicle using a lift assist device mounted to the vehicle;
   moving the vehicle along a second route to transport the item to a desired location, the passage of time a passage of time since the vehicle last delivered another item to the desired location;
   at the desired location, unloading the item from the vehicle using the lift assist device;
   and sliding the lift assist device along a crossbar in a cross-vehicle direction after moving the vehicle along the first route and before moving the vehicle along the second route.

2. The item repositioning method of claim 1, wherein the first route and the second route are each at least partially planned using data obtained by the vehicle, the data including information about areas near the vehicle, areas near the item, or both.

3. The item repositioning method of claim 2, further comprising using at least one sensor of the vehicle to obtain the data.

4. The item repositioning method of claim 2, further comprising using at least one camera of the vehicle to obtain data.

5. The item repositioning method of claim 2, wherein the first route and the second route are each at least partially planned using data obtained by a drone.

6. The item repositioning method of claim 2, wherein portions of the first route are planned when the vehicle is moving along the first route.

7. The item repositioning method of claim 1, wherein the request is a request that is sent from a user.

8. The item repositioning method of claim 1, wherein the first route is the same as the second route.

9. The item repositioning method of claim 1, further comprising moving the vehicle autonomously along the first route and moving the vehicle autonomously along the second route.

10. The item repositioning method of claim 1, wherein the vehicle is a passenger vehicle.

11. The item repositioning method of claim 1, wherein the vehicle is a road vehicle.

12. The item repositioning method of claim 1, wherein the lift assist device is a robotic arm.

13. The item repositioning method of claim 1, further comprising, during the loading, positioning the item in a first area of the vehicle when the item is a first type of item, and positioning the item in a different, second area of the vehicle when the item is a different, second type of item.

14. The item repositioning method of claim 1, further comprising autonomously moving the vehicle to a location of trash and using the lift assist device to load the trash into the vehicle.

15. A vehicle assembly, comprising:
   a cargo bed of a vehicle;
   a crossbar spanning the cargo bed, the crossbar slidable relative to the cargo bed;
   a lift assist device mounted to the crossbar, the lift assist device slidable relative to the vehicle in a cross-vehicle direction; and
   at least one sensor that collects data used to plan a route for the vehicle to autonomously move to a location of an item within a worksite where the lift assist device can load the item into the cargo bed for delivery to a desired location, the route planned at least in part in response to a request for the item, the request sent based on a passage of time since the vehicle last delivered another item to the desired location, wherein the lift assist device is configured to stabilize the item within the cargo bed when the vehicle is transporting the item.

16. The vehicle assembly of claim 15, wherein the vehicle is a pickup truck.

17. The item repositioning method of claim 1, further comprising, when moving the vehicle along the second route to transport the item to the desired location, stabilizing the item with the lift assist device.

18. The item repositioning method of claim 1, wherein the first route and the second route are within a worksite.

19. The vehicle assembly of claim 15, wherein the at least one sensor is further configured to collect data used to plan another route for the vehicle to autonomously from the location within the worksite where the item can be loaded into the vehicle to another location within the worksite where the item can be unloaded from the vehicle.

* * * * *